United States Patent [19]

Kamis

[11] Patent Number: 5,126,722
[45] Date of Patent: Jun. 30, 1992

[54] POINT OF LUBE MONITOR

[75] Inventor: Peter A. Kamis, Willoughby Hills, Ohio

[73] Assignee: Lubriquip, Inc., Cleveland, Ohio

[21] Appl. No.: 650,226

[22] Filed: Feb. 4, 1991

[51] Int. Cl.⁵ .............................................. G08B 21/00
[52] U.S. Cl. ..................................... 340/606; 184/7.4; 184/108; 200/81.9 M
[58] Field of Search ............... 184/7.4, 6.4, 108; 73/861.53, 861.54, 861.71, 861.58; 200/81.9 M, 82 E; 116/267, 273; 340/611, 608, 606; 137/860

[56] References Cited

U.S. PATENT DOCUMENTS

| | | | |
|---|---|---|---|
| 1,910,752 | 5/1933 | Coles | 116/273 |
| 2,310,504 | 2/1943 | Aubert | 200/81.9 M |
| 2,963,563 | 12/1960 | Patterson | 200/81.9 M |
| 3,632,923 | 1/1972 | Paine | 200/81.9 M |
| 4,181,835 | 1/1980 | Stadler et al. | 200/82 E |
| 4,194,435 | 3/1980 | Gaun et al. | 137/860 |
| 4,214,607 | 7/1980 | Bouteille | 137/860 |
| 4,350,050 | 9/1982 | Nelson | 73/861.54 |
| 4,507,976 | 4/1985 | Banko | 73/861.54 |
| 4,574,920 | 3/1986 | Callahan et al. | 184/39.1 |

FOREIGN PATENT DOCUMENTS 1231225  5/1971  United Kingdom .......... 200/81.9 M

OTHER PUBLICATIONS

Drawing No. 456,060.029, "Plunger and Bushing Assy for 3057 series Lube Albert Assy", Jan. 23, 1979, 1 page.
Blueprint No. C-456-060-009, Trabon and Manzel Centralized Lubrication Systems, "Lube Line Alert Assembly", Jun. 1, 1982, 2 pages.

*Primary Examiner*—Ira S. Lazarus
*Assistant Examiner*—Alan B. Cariaso
*Attorney, Agent, or Firm*—Hill, Van Santen, Steadman & Simpson

[57] ABSTRACT

A piston-type point of lubrication magnetic flow indicator providing a barrel interfit with a bushing having a cylinder portion penetrating the barrel coaxially and a magnetic piston which reciprocates closely interfit inside the cylinder portion of the bushing. Lube oil enters an inlet port of the bushing, flows through a check valve into the cylinder portion, and impinges on one end of the magnetic piston. The impinging causes the magnetic piston to move in the cylinder portion uncovering at least one port formed through the cylinder portion which opens the cylinder portion to the barrel, directing flow thereto. The lubricating oil flows through the barrel and out of an aperture formed at a forward end of the barrel to a lubrication point. Movement of the magnetic piston through the cylinder portion triggers a magnetic reed switch mounted on an outside circumference of the barrel and generally overlying the relative axial position of the piston in the cylinder portion. The opening and closing of the reed switch can be electrically monitored by electronic lubrication monitoring systems or controls as are known.

16 Claims, 1 Drawing Sheet

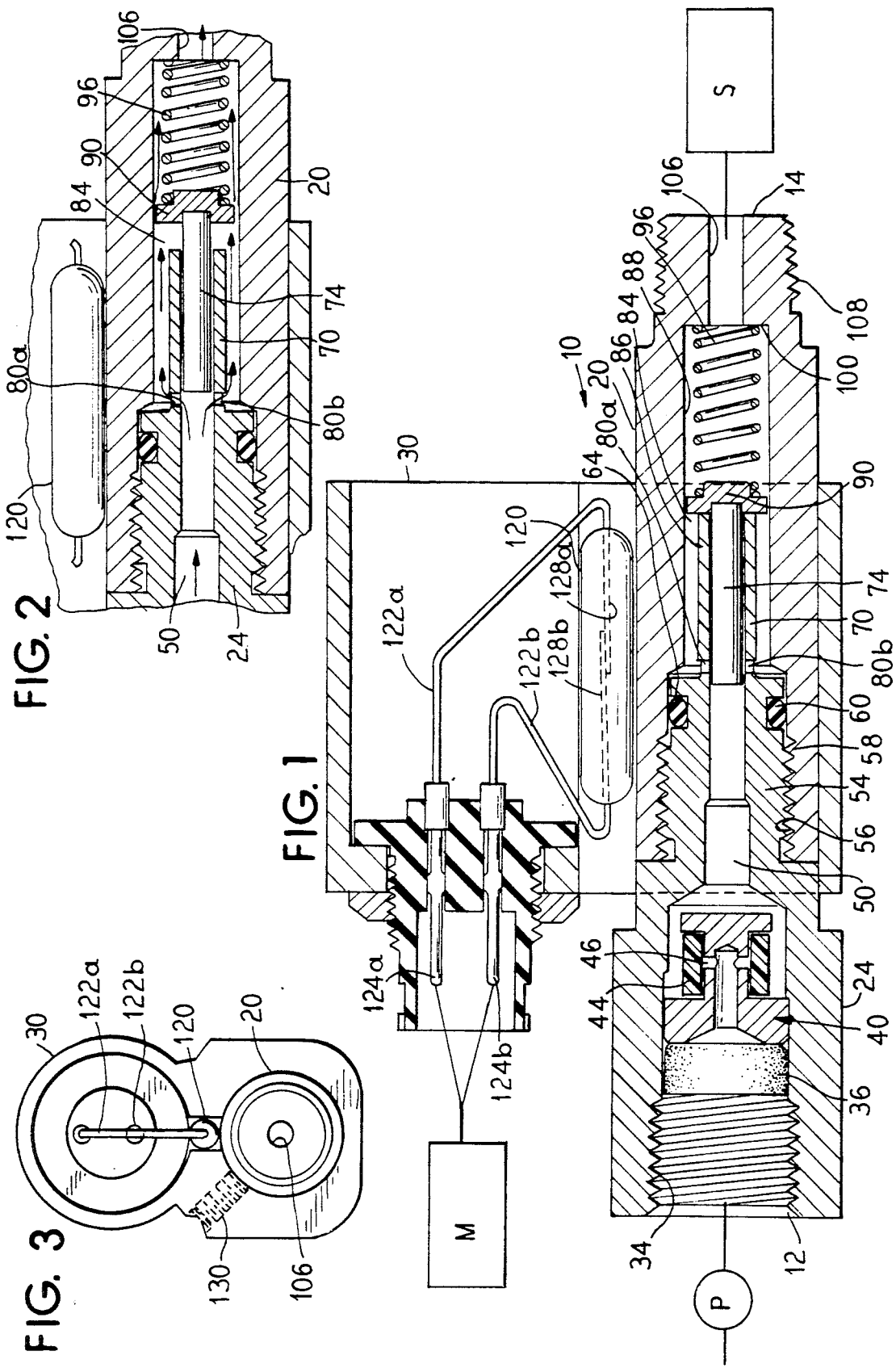

1

POINT OF LUBE MONITOR

BACKGROUND OF THE INVENTION

This invention relates to a point of lubrication flow indicator, in particular this invention relates to a piston-type flow switch and an improvement thereof.

In a piston-type flow switch a plunger is placed directly in the fluid flow stream flowing through a barrel-like body. As flow increases, the flow, impinging upon a first end of the plunger, pushes the plunger against the bias of a spring until the plunger passes and uncovers a port. This plunger abuts at a second end, a magnetic piston. The resultant movement of the magnetic piston influences a magnetic reed switch mounted to an outside of the barrel-like body adjacent to the magnetic piston but not exposed to the fluid stream. Once the plunger passes the port, lubrication fluid can then flow from one end of the barrel-like body, through the port and downstream, past the magnetic piston and out of the body to the point of lubrication. When flow stops, the spring pushes the piston and plunger back and closes the reed switch. The magnetic piston must fit loosely enough so that the lubricant can flow past the magnetic piston and also so that lubricant can leak past the magnetic piston and allow the magnetic piston to retract. Some designs use carefully sizes holes in the piston to accomplish this task.

This design of the piston-type flow switch tends to be very sensitive to viscosity and to flow rate. While a piston-type flow switch designed for very low flow rate could operate at a higher flow rate, it would present a very high pressure drop in the small passages such as the holes in the piston. Several range variations of this sensor would, almost certainly, be required.

SUMMARY OF THE INVENTION

The present invention relates to point of lube flow monitors, in particular, to a piston-bypass-type magnetic flow switch. The present invention improves the known prior art devices to create a simple, easily manufactured, and more flow efficient lubrication monitor. Unlike the prior art devices which utilized a plunger reciprocally moving inside a fitted bushing, the plunger abutting a separate magnetic piston interfit into the barrel, the present invention combines the magnetic piston and plunger into a single magnetic piston. The magnetic piston reciprocally moves inside a fitted bushing and when sensing flow, moves against the bias of a spring to uncover at least one port. The lubricating fluid passes through the port, through a channel formed between the outside barrel and the fitted bushing, and finally exits forwardly of the barrel. Unlike the prior art, the lubricating oil need not slip past or through the close confines between the magnetic piston and the inside surface of the barrel. The movement of the magnetic piston triggers a magnetically activated reed switch mounted onto an outside of the barrel.

BRIEF DESCRIPTION OF THE DRAWINGS

FIG. 1 is a longitudinal sectional view through the lube monitor of the present invention;

FIG. 2 is a partial sectional view of the lube monitor of FIG. 1 with the lube monitor in a flow condition; and FIG. 3 is a right side elevational view of the lube monitor of FIG. 1.

DETAILED DESCRIPTION OF THE PREFERRED EMBODIMENTS

FIG. 1 shows a lube monitor at 10 which receives at an inlet port 12 lube oil from a pump P, discharges lube oil from an outlet port 14 to the point requiring lube S, and communicates electrically to a status monitor or control circuit M. The lube monitor comprises a barrel 20, a bushing 24 interfit into the barrel 20, and a switch housing 30 mounted to the barrel 20.

The bushing 24 comprises, in series a threaded inlet channel 34, a filter 36, and a check valve 40 having a flexible ring 44 covering a plurality of holes 46. Flow out of the holes 46 will pass around or seep by the flexible ring 44 which may expand slightly under pressure, whereas attempted flow in an opposite direction, into the holes 46, will tend to seal the flexible ring 44 against the holes, preventing flow. Thus the ring 44 acts as a one-way valve or check valve. During a flow condition, flow will pass through the check valve 40 from the threaded axial channel 34 and into a downstream axial channel 50.

A center section 54 of the bushing 24 has external threads 56 which engage a threaded socket 58 of the barrel 20. An O-ring 60 is provided to seal between the barrel 20 and the bushing 24. The O-ring 60 is located in a rectangular trough 64 formed around the center section 54 of the bushing 24. At a front end of the bushing 24 is a cylinder section 70. Reciprocally residing in the cylinder section 70 is a magnetic piston 74 which is interfit into the cylinder section 70 with close fitting tolerances. At a root of the cylinder section 70 are formed at least one port, and preferably at least two ports 80a, 80b. The ports 80a, 80b, communicate between the downstream axial channel 50 and an annular channel 84 defined between an outside surface 86 of the cylinder section 70 and an inside surface 88 of the barrel 20.

Mounted at a forward end of the magnetic piston 74 is an end cap 90 which is biased against the cylinder section 70 by a spring 96 abutting the end cap 90 and a front ledge 100 of the barrel 20. The barrel 20 terminates at said outlet port 14 in an aperture 106 surrounded by a threaded male connection portion 108.

The switch housing 30 holds therein a magnetic reed switch 120 having a first lead 122a and a second lead 122b which are electrically connected to terminals 124a and 124b, respectively. The terminals 124a, 124b are thereafter connected to a monitoring device M which can be an electronic device having annunciators warning of a lube oil failure or can be a computer control or database or the like. Movement of the magnetic piston 70 influences the electrical connection between a first contact 128a, and a second contact 128b of the reed switch, alternately making and breaking the connection as the magnetic piston 74 reciprocates in the cylinder section 70.

FIG. 2 shows the condition of the magnetic piston 74 in the cylinder section 70 during a flow condition. As indicated by the flow indicating arrows in the figure, lube oil passes through the downstream channel 50 and impinges on the magnetic piston 74 to drive the magnetic piston 74 to the right in FIG. 2, and to compress the spring 96. The lube oil flows through the ports 80a, 80b, through the annular channel 84 past the end cap 90 and out of the aperture 106 and eventually to the lube oil point S. Unlike the prior commercial devices which required the lube oil to flow past the magnetic piston through narrow passages, the present invention provides for increased flow areas.

As an additional advantage, by eliminating the need for both a plunger and a magnetic piston arranged in series longitudinally, the present invention utilizes only a single piece magnetic plunger/piston whereby the length of the bushing and barrel can be reduced. Holes or channels in the magnetic piston need not be formed or machined to provide for fluid passage since the lubricant flows in the annular passage 84 and not through or closely around the magnetic piston. The end cap 90 can have more openings and a smaller thickness in the longitudinal direction, thus providing a flow resistance lesser than the former magnetic piston arrangement.

FIG. 3 shows the lube monitor 10 from a right side elevational view showing the switch housing 30 mounted to the barrel 20 and a set screw 130 proceeding through the switch housing 30 to engage an outside diameter of the barrel 20 to lock the switch housing 30 onto the barrel 20. The leads 122a, 122b are shown connected to the magnetic reed switch 120.

Although the present invention has been described with reference to a specific embodiment, those of skill in the art will recognize that changes may be made thereto without departing from the scope and spirit of the invention as set forth in the appended claims.

I claim as my invention:

1. A flow sensing device comprising:
   a barrel having a discharge aperture at a first end;
   a bushing having an inlet at one end and a cylinder section at an opposite end, said cylinder section having at least one port piercing a side wall thereof, said bushing having a flow channel from said inlet to said port, said cylinder section terminating in an open end within said barrel;
   said bushing sealingly mounted to said barrel with said cylinder section extending inside said barrel;
   a magnetic piston reciprocally housed inside said cylinder section, said piston and said cylinder section sized in length for said piston to protrude at a first end outwardly of said open end of said cylinder section;
   a means for biasing said piston into a first position along an axis of said cylinder section, covering said port; and
   a magnetic sensing means mounted to said barrel and in magnetic communication through said barrel with said magnetic piston for registering a signal corresponding to the movement of said magnetic piston in said cylinder section.

2. A flow sensing device according to claim 1, further comprising an end cap said end cap mounted to said first end of said piston, said end cap having a size greater than an inside clearance of said cylinder section limiting retraction movement of said piston into said cylinder section; and
   said means for biasing comprises a spring, said spring abutting an inside portion of said barrel at one end and said end cap at another end.

3. A flow sensing device according to claim 2, comprising a sealing O-ring; and
   wherein said bushing comprises a center section between said inlet and said cylinder section, said center section comprising a threaded outer circumference and holding said sealing O-ring; and
   said barrel comprises at a second end a threaded channel, said center section of said bushing threadingly engaged inside said threaded channel and said sealing O-ring compressible to form said seal between said bushing and said barrel.

4. A flow sensing device according to claim 3, wherein said bushing comprises a unitary structure.

5. A flow sensing device according to claim 4, wherein said means for magnetic sensing comprises a magnetic reed switch.

6. A flow sensing device according to claim 5, wherein said device further comprises a check valve residing in said bushing and having a plurality of holes covered by a flexible ring.

7. A flow sensing device according to claim 1, comprising a sealing O-ring; and
   wherein said bushing comprises a center section between said inlet and said cylinder section, said center section comprising a threaded outer circumference and holding said sealing O-ring; and
   said barrel comprises at a second end a threaded channel, said center section of said bushing threadingly engaged inside said threaded channel and said sealing O-ring compressible to form said seal between said bushing and said barrel.

8. A flow sensing device according to claim 7, wherein said bushing comprises a unitary structure.

9. A flow sensing device according to claim 1, wherein said means for magnetic sensing comprises a magnetic reed switch.

10. A flow sensing device according to claim 1, wherein said device further comprises a check valve residing in said bushing and having a plurality of holes covered by a flexible ring.

11. A flow sensing device comprising:
    a fitting having a channel therethrough with an inlet for receiving a flow of fluid under pressure and an outlet for discharging said fluid;
    a magnetic piston reciprocably carried in said channel and having a front face exposed to said fluid flowing in through said inlet;
    biasing means for urging said piston towards said inlet to a first position within said channel;
    an end cap mounted to an end of said piston opposite said front face, said end cap arranged between said biasing means and said piston;
    a bypass passage having an inlet in communication with said channel in a portion of said channel occupied by said piston when said piston is in said first position, said piston closing said inlet when in said first position and having an outlet communicating with said channel upstream of said channel outlet;
    a stop means fixed in position with respect to said barrel and abuttable to said end cap for limiting movement of said piston toward said inlet to said first position;
    a magnetic sensing mans outside of said channel in magnetic communication with said magnetic piston for registering a signal corresponding to movement of said magnetic piston in said channel;
    whereby, when said fluid under pressure flows into said fitting it impinges on said front face of said piston moving it against said biasing means toward said outlet to expose said bypass inlet allowing said fluid to flow through said bypass passage to said channel outlet.

12. A flow sensing device according to claim 11, wherein said bypass passage is annular.

13. A flow sensing device according to claim 11 further comprising a one way check valve provided between said channel inlet and said bypass passage inlet.

14. A flow sensing device according to claim 11, wherein said channel has a shoulder therein downstream of said piston and said biasing means comprises a spring extending between said shoulder and said piston.

15. A flow sensing device according to claim 11, wherein said fitting comprises a plurality of pieces screw threaded together.

16. A flow sensing device according to claim 11, wherein said means for magnetic sensing comprises a magnetic reed switch.

* * * * *